United States Patent [19]

Kats

[11] Patent Number: 5,563,581
[45] Date of Patent: Oct. 8, 1996

[54] SAFETY DEVICE FOR MACHINE TOOL OPERATORS, AND THE LIKE

[76] Inventor: Vyacheslav Kats, 915 47th St., #1R, Brooklyn, N.Y. 11219

[21] Appl. No.: 498,431

[22] Filed: Jul. 5, 1995

[51] Int. Cl.⁶ .......................... G08B 13/181; G08B 21/00
[52] U.S. Cl. .......................... 340/567; 307/117; 340/679; 340/825.31
[58] Field of Search .................... 340/567, 679, 340/825.31; 307/117

[56] References Cited

U.S. PATENT DOCUMENTS

| 3,564,501 | 2/1971 | Flook, Jr. | 340/825.31 |
| 4,453,161 | 6/1984 | Lemelson | 340/825.31 |
| 5,315,289 | 5/1994 | Fuller et al. | 340/573 |
| 5,345,138 | 9/1994 | Mukaidono et al. | 307/117 |
| 5,436,613 | 7/1995 | Ghosh et al. | 340/573 |

Primary Examiner—Glen Swann
Attorney, Agent, or Firm—Ilya Zborovsky

[57] ABSTRACT

A safety device for machine tool operators has a generator for RF signals, an antenna connected with the generating means for receiving the generated signals, and positionable in the vicinity of a working zone of the machine tool to supply the signal to the working zone, an and element to be worn by an operator and providing a delayed version of the RF signal when the element is located in the vicinity of the antenna. An RF signal receiver is connected with the antenna and receives the delayed RF signal supplied by the element, a blocking unit is connected with the receiving means and blocks a machine tool drive when the RF signal delayed by the element worn by the user is received by the receiving means.

6 Claims, 3 Drawing Sheets

FIG. 2
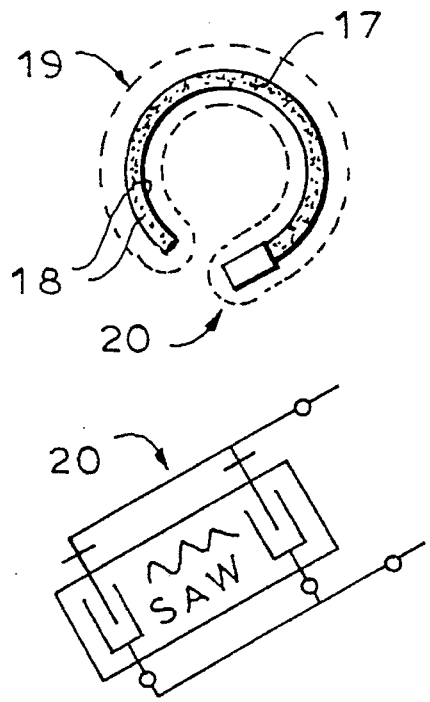
FIG. 4
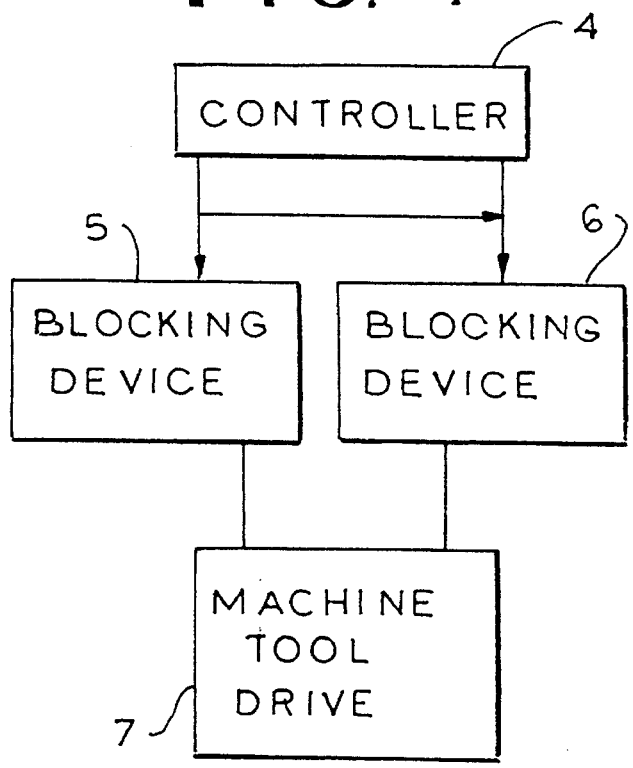
FIG. 3 b. 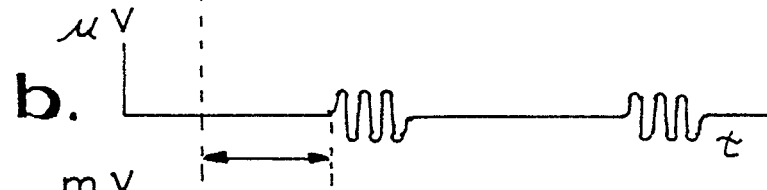
c. 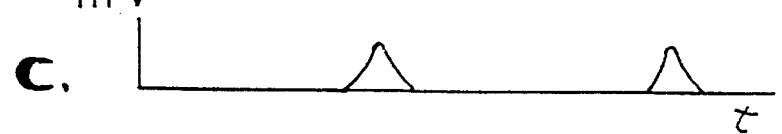
d. 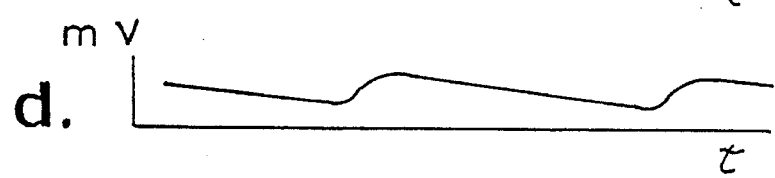

FIG. 8
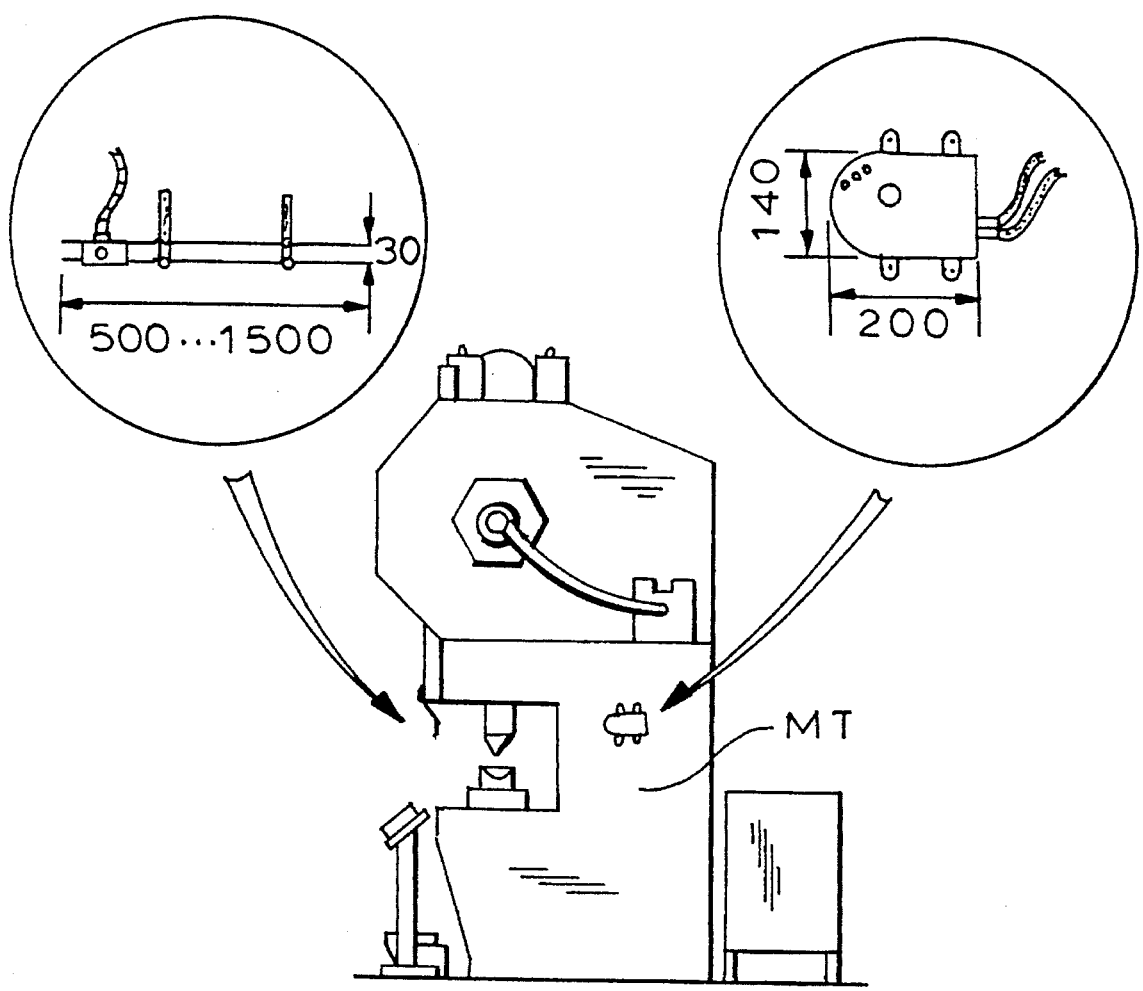
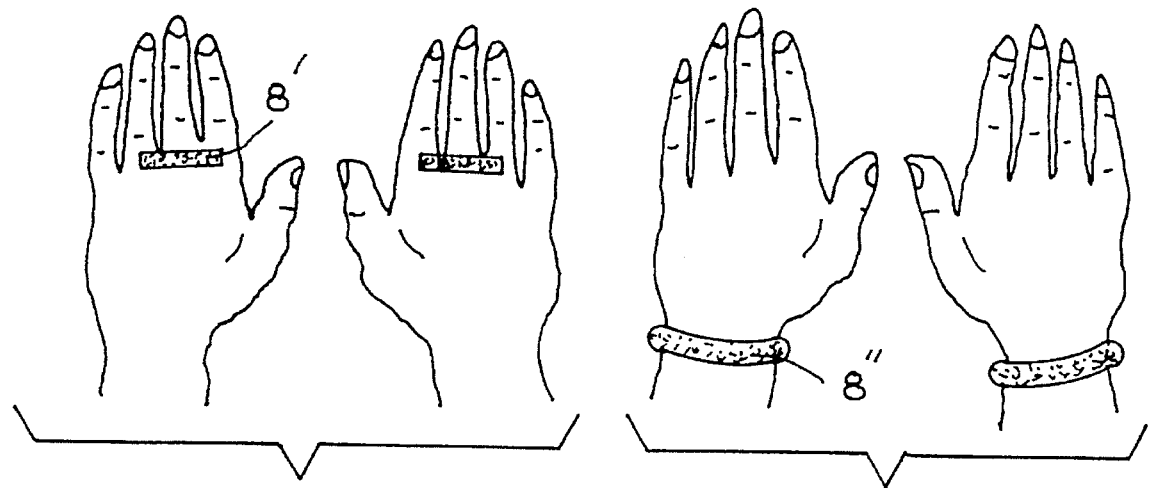
FIG. 6  FIG. 7

5,563,581

SAFETY DEVICE FOR MACHINE TOOL OPERATORS, AND THE LIKE

BACKGROUND OF THE INVENTION

The present invention relates to a safety device for machine tool operators.

More particularly, it relates to a safety device which prevents injuries of a machine tool operator when his hands are in the operating zone of the machine tool and the machine tool is activated accidentally.

Devices of the above mentioned general type are known in the art. One of such devices is based on a light barrier principle and includes a light sensitive element arranged near the working zone of the machine tool and reacting to the presence of operator's hands which block the light, so that a signal is produced and supplied to the machine drive blocking unit. The device based on the light barrier principle has however the disadvantages that it reacts not only on the operator's hands in the working zone, but also on any object in the working zone including raw materials, workpieces, etc. Therefore, such devices are impractical, and many instances operators deactivate these devices to facilitate manipulations in the working zone of the machine tool.

SUMMARY OF THE INVENTION

Accordingly, it is an object of the present invention to provide a safety device for machine tool operators, which avoids the disadvantages of the prior art.

In keeping with these objects and with others which will become apparent hereinafter, one feature of the present invention resides, briefly stated, in a safety device for machine tool operators which has means for generating RF signals, an antenna connected with the generating means and receiving the generated signals, the antenna being positionable in the vicinity of working zone of the machine tool, an element to be worn by an operator and providing a time delay of the antenna generated RF signal when the element is located in the vicinity of the antenna, RF signal receiving means connected with the antenna and receiving the RF signal delayed by the element and means connected with the receiving means and blocking a machine tool drive when the RF signal delayed by the element is received by the receiving means.

When the safety device is designed in accordance with the present invention, the drive of the machine tool is reliably blocked when the hands of the operator approach the working zone of the machine tool.

In accordance with a further feature of the present invention, an operator without the safety element cannot operate the machine tool, since there is a further blocking unit which initially blocks the drive completely. Only when the safety element on the operator's hand approaches the antenna, the further blocking unit is unblocked to allow operation of the machine tool. Then the initial system starts operating, and in the event if the hands of the operator enter the working zone, the drive which has been previously unblocked, cannot be activated again.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a view schematically showing a safety element to be worn by an operator;

FIG. 3 is an electric circuit of the safety element of FIG. 2 in accordance with the present invention;

FIG. 4 is a view showing a further modification of the inventive transmitting-receiving unit of the inventive device;

FIGS. 6 and 7 are views showing operator's safety elements in two different modifications; and FIG. 8 is a view showing a machine tool provide with the inventive device.

DESCRIPTION OF THE PREFERRED EMBODIMENTS

Figure 1:
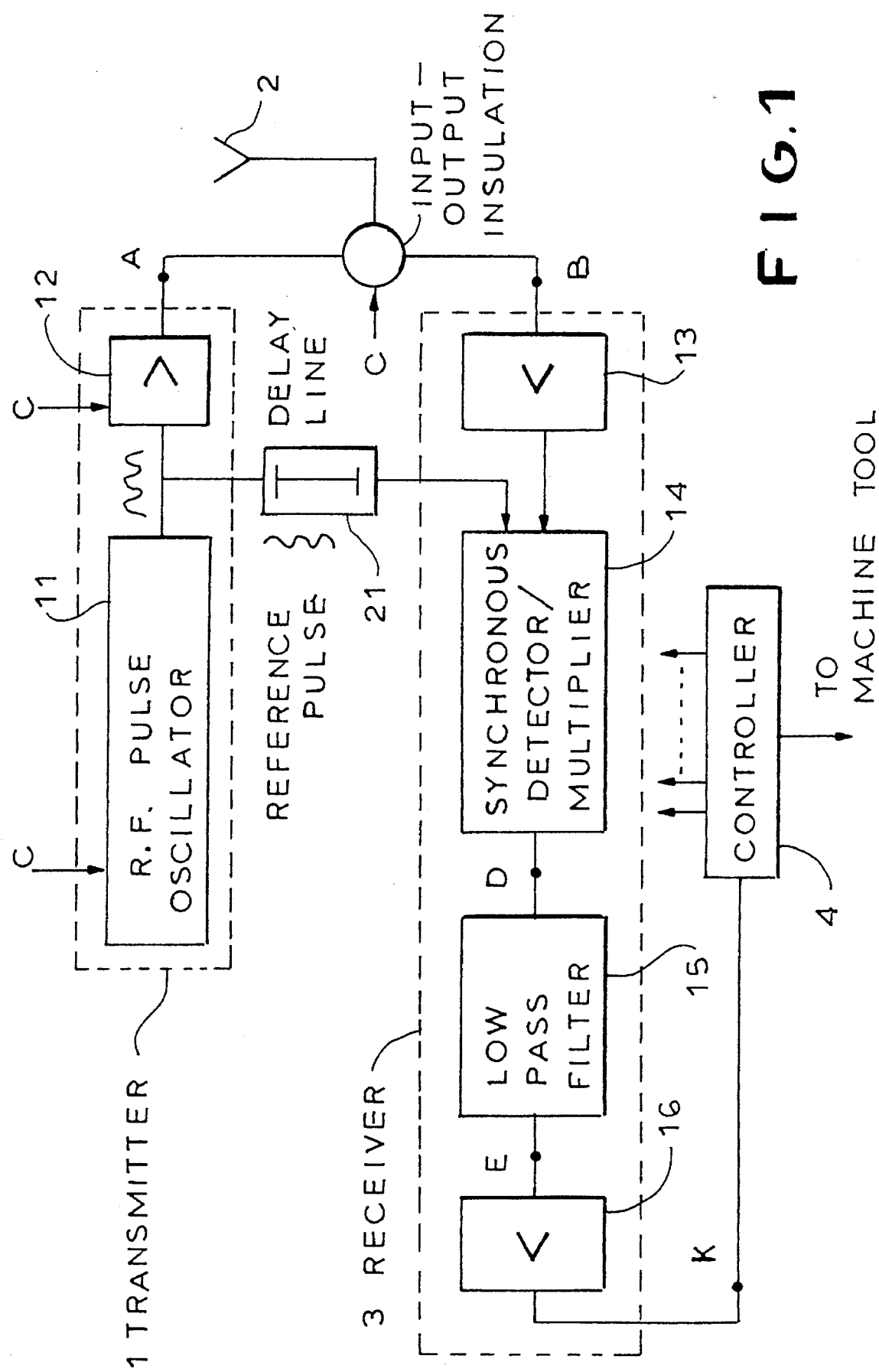
FIG. 1 is a view showing a transmitting-receiving unit of a safety device in accordance with the present invention.

A safety device for machine tool operators to prevent injuries of operator's hands by the machine tool MT shown in FIG. 8 includes a transmitter unit which is identified as a whole with reference numeral 1, an RF antenna which is identified with reference numeral 2, and a receiving unit which is identified as a whole with reference numeral 3. A controller 4 is connected with the receiving unit and its output signals activate two blocking units 5 and 6 acting on a drive 7 of the machine tool.

A transmitting unit includes an RF generator formed as a pulse signal oscillator 11 and connected with an amplifier 12 which in turn are connected to the antenna 2. A receiving unit includes an amplifier 13 connected to the antenna, a synchronous detector/multiplier 14, a low pass filter 15, and a further amplifier 16 connected to the controller 4.

The operator's safety element 8 can be formed as a ring 8' shown in FIG. 6 or a bracelet 8" shown in FIG. 7. As seen in FIGS. 2 & 3 it; has an insulator layer 17 with metal foil layers 18 and a sheath 19, and is provided with an RF acoustic delay line element 20 with a central frequency $F_0$ which is more than 10 MHz while band pass is more than 2% of F. An RF pulse signal delay line 21 connects the oscillator 11 to the detector/multiplier 14 directly.

The inventive device operates in the following manner:

The oscillator 11 generates RF pulse signals which are amplified in the amplifier 12 and supplied to the antenna. In the presence of the operator's safety element 8, the RF signals are delayed with approximately 4–8 µs delay. The delay provides the separation of the weak signals reflected from the operator's safety element 8 from strong signals generated by the oscillator, so that the time delayed, reflected weak RF signal is supplied to the receiver. The signal is amplifier in the amplifier 13 and supplied to the synchronous detector/multiplier 14. At the same time, the basic reference signal is supplied through the delay line 21 with the same time delay to the detector/multiplier 14. If the detector/multiplier 14 receives the time delayed signals from the delay line 21, and from the antenna 2, they are multiplied and a constant signal component is produced, which is then utilized for controlling the machine tool. If however, only the reference time delay signal is supplied through the delay line 21, but there is no time delay signal supplied from the antenna 2 when the operator's hands with the operator's safety element are not in the vicinity of the working zone, the constant signal is not produced by the detector/multiplier 14, and no signal is supplied to the controller for blocking the drive of the machine tool. For the situation when the operator's hands with the operator's safety element are in the vicinity of the antenna 1, as explained hereinabove, the signals from the antenna and from the delay line 21 are multiplied in the detector/multiplier and supplied to the low pass filter 15 in which the constant signal component is separated from noise and other disturbances. The constant signal component is amplified in the amplifier 16 and supplied to the controller 4.

The controller 4 controls the whole transmitter-antenna-operator safety element-receiver circuit. At the same time, when the controller 4 receives the signal from the amplifier 16, it produces a controlling signal and supplies it to the blocking device 5 so as to block the drive 7 of the machine tool. The drive cannot operate and the machine tool stops in response to the operator's safety element 8 in the vicinity of the working zone.

In accordance with another feature of the present invention, means are provided for preventing operation of the machine tool by operator's hand without the operator's safety element 8. The controller is connected to the machine tool drive through the second blocking unit 6 which blocks the drive normally when the machine tool is not in operation for a certain short period of time for example 3 minutes. the operator's without the bracelet cannot deactivate the blocking unit 6, and the machine tool cannot be activated by the operator without the operator's safety element.

When however the operator's hand with the operator's safety element approach the working zone and the antenna, the signal is generated and processed as described hereinabove, and is supplied to the blocking unit 6 to unblock the drive of the machine tool, and therefore the machine tool can operate in a normal standard way. If the hands of the operator with the operator's safety element enter the working zone too far, the operator's safety element produces, as described above, the signal which acts on the blocking unit 5 and the drive of the machine tool is stopped. In other words, the drive of the machine tool is usually blocked, it can unblocked only when the operator's hands are provided with the operator's safety element, it operates normally if the operator's hands with the operator's safety element do not enter too far into the working zone, and when the operator's hands enter too far into the working zone and the operator's safety element reaches the sensitive area of the antenna, the drive of the machine tool is blocked so that the operator's hands cannot be injured.

In accordance with another feature of the present invention, the delay line 21 supplies to the detector/ multiplier a signal with a phase which is turned by 90°. On the other hand, between the amplifier 13 and the detector/ multiplier 14 an additional element is arranged which separates the signal from the amplifier 13 into two components and turns one signal component by 90° relative to the other signal component. In the detector/multiplier, each of the components is multiplied by the signal supplied through the time delay line 21, and therefore in any event the constant signal is produced at the outlet of the detector/multiplier.

Figure 5:
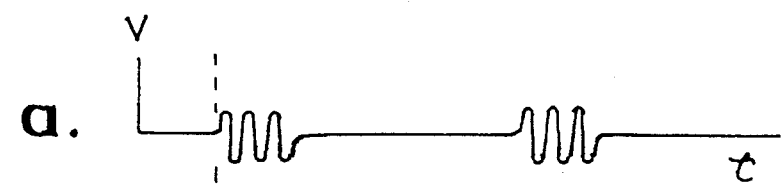
FIG. 5 is a view showing signal diagrams for the inventive safety device.

In the signal diagrams in FIG. 5, the diagram a. illustrates a signal generated by the oscillator and including a plurality of radiopulses; b. illustrates a signal reflected by the bracelet or ring with the delay; c. illustrates a signal at the output of the detector/multiplier; and d. illustrates a signal at the output of the low pass filter.

As for the operator's safety element (bracelet or ring) it can be composed of the substrate of lithium niobate and interdigital transducers applied on its surface, so as to form a surface acoustic wave (SAW) delay line.

It will be understood that each of the elements described above, or two or more together, may also find a useful application in other types of constructions differing from the types described above.

While the invention has been illustrated and described as embodied in a safety device for machine tool operators, and the like, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A safety device for machine tool operators, comprising means for generating RF signals; an antenna connected with said generating means and receiving the generated signals, said antenna being positionable in the vicinity of a working zone of the machine tool to supply said Signal to said working zone; an element to be worn by an operator and providing a time delayed version of the RF signal supplied by said antenna when said element is located in the vicinity of the antenna; delayed RF signal receiving means connected with said antenna and receiving the delayed RF signal supplied by said element; and means connected with said receiving means and blocking a machine tool drive when the RF signal delayed by said element is received by said receiving means.

2. A safety device as defined in claim 1, wherein said element is formed as a bracelet to be worn on an operator's arm.

3. A safety device as defined in claim 1, wherein said element is formed as a ring to be worn on an operator's finger.

4. A safety device as defined in claim 1, wherein said generating means includes an RF signal pulse generator and an amplifier receiving the signal generated by said generator and supplying the received signal to said antenna.

5. A safety device as defined in claim 1; and further comprising a delay line directly connecting said generating means and said receiving means so as to provide a reference delayed RF signal, said receiving means including detecting means for receiving said reference delayed RF signal and for receiving said RF signal delayed by said element so as to multiply said signals and therefore to provide a constant signal component; and separating means connected with said multiplying means and separating said constant signal component from a noise signal to supply said constant signal component to said blocking means.

6. A safety device as defined in claim 1; and further comprising further blocking means for blocking a machine tool drive when said element is not in the vicinity of said antenna for a relatively short period of time so as to prevent operation of the machine tool by an operator without said element, said further blocking means unblocking the machine tool drive when said element is brought in the vicinity of said antenna and said receiving means receive the delayed RF signal from said element.

\* \* \* \* \*